(12) United States Patent
Nesti et al.

(10) Patent No.: US 11,046,434 B2
(45) Date of Patent: Jun. 29, 2021

(54) METHODS AND APPARATUS TO ALIGN AND SECURE AIRCRAFT

(71) Applicant: The Boeing Company, Chicago, IL (US)

(72) Inventors: Hugh William Nesti, West Chester, PA (US); Jacob A. Levinson, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 859 days.

(21) Appl. No.: 15/708,920

(22) Filed: Sep. 19, 2017

(65) Prior Publication Data

US 2019/0084664 A1 Mar. 21, 2019

(51) Int. Cl.
| | | |
|---|---|---|
| *B64D 5/00* | (2006.01) | |
| *B64C 39/02* | (2006.01) | |
| *B64C 37/02* | (2006.01) | |
| *B64D 39/00* | (2006.01) | |

(52) U.S. Cl.
CPC ............... *B64D 5/00* (2013.01); *B64C 37/02* (2013.01); *B64C 39/024* (2013.01); *B64C 2201/021* (2013.01); *B64C 2201/063* (2013.01); *B64C 2201/143* (2013.01); *B64D 39/00* (2013.01)

(58) Field of Classification Search
CPC ......... B64C 3/00; B64C 23/069; B64C 37/02; B64C 39/024; B64C 2201/021; B64C 2201/063; B64C 2201/104; B64C 2201/143; B64D 39/00
See application file for complete search history.

(56) References Cited

U.S. PATENT DOCUMENTS

| | | | |
|---|---|---|---|
| 2,809,792 A | 10/1957 | Hohmann | |
| 2,863,618 A | 12/1958 | Doyle et al. | |
| 3,161,373 A * | 12/1964 | Vogt ........................ | B64D 5/00 244/2 |
| 3,226,056 A | 12/1965 | Holland, Jr. | |
| 3,249,322 A | 5/1966 | Holland, Jr. | |
| 6,641,082 B2 * | 11/2003 | Bevilaqua ............... | B64D 5/00 244/189 |
| 7,357,352 B2 | 4/2008 | Speer et al. | |
| 7,789,339 B2 * | 9/2010 | Sommer ................. | B64C 37/02 244/3 |
| 8,061,646 B2 * | 11/2011 | Gomez ................. | B64C 23/076 244/2 |

(Continued)

OTHER PUBLICATIONS

European Patent Office, "Communication Pursuant to Article 94(3) EPC," issued in connection with European Patent Application No. 18193899.4, dated Jul. 28, 2020, 4 pages.

(Continued)

*Primary Examiner* — Marc Burgess
(74) *Attorney, Agent, or Firm* — Hanley, Flight & Zimmerman

(57) ABSTRACT

Methods and apparatus to align and couple aircraft are disclosed. An example apparatus for securing a first aircraft to a second aircraft includes a guide to direct movement of a first wing of the first aircraft relative to a second wing of the second aircraft to align the first wing with the second wing, and a lock configured to couple the first wing to the second wing after the guide aligns the first wing to the second wing.

20 Claims, 13 Drawing Sheets

(56) References Cited

U.S. PATENT DOCUMENTS

| | | | |
|---|---|---|---|
| 8,936,212 B1* | 1/2015 | Fu | B64C 37/02 |
| | | | 244/6 |
| 10,059,428 B2* | 8/2018 | Robertson | B64D 5/00 |
| 2014/0064979 A1* | 3/2014 | Colling | B63B 1/248 |
| | | | 416/223 R |
| 2015/0120126 A1 | 4/2015 | So et al. | |
| 2016/0214717 A1 | 7/2016 | De Silva | |

OTHER PUBLICATIONS

European Patent Office, "Communication Pursuant to Article 94(3) EPC," issued in connection with European Patent Application No. 18193899.4, dated Dec. 17, 2019, 4 pages.

European Patent Office, "Extended European Search Report," issued in connection with European Application No. 18193899.4, dated Feb. 25, 2019, 10 pages.

* cited by examiner

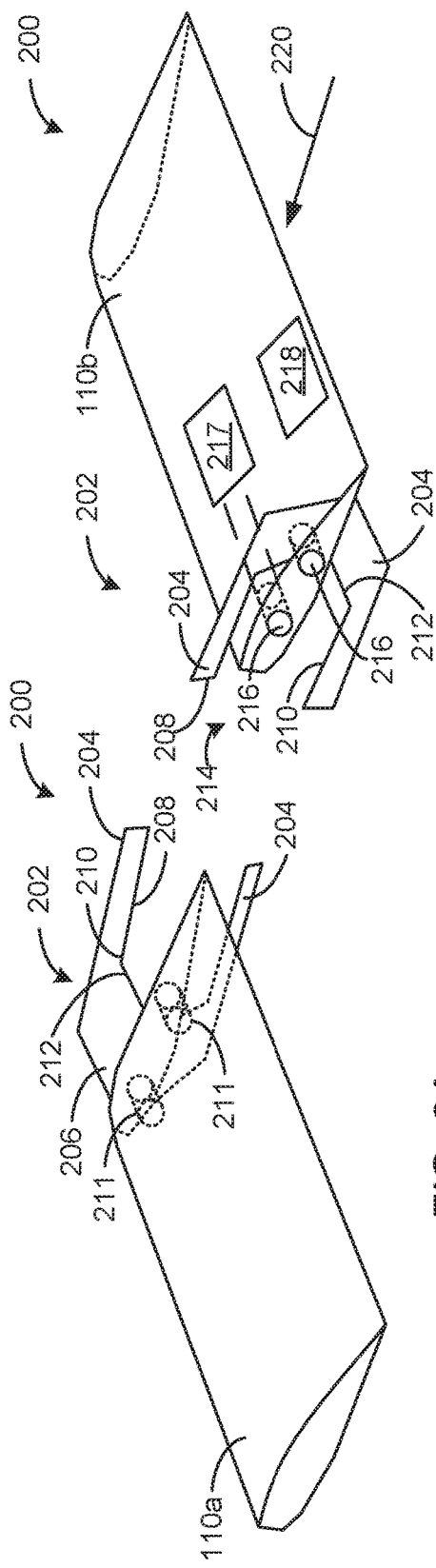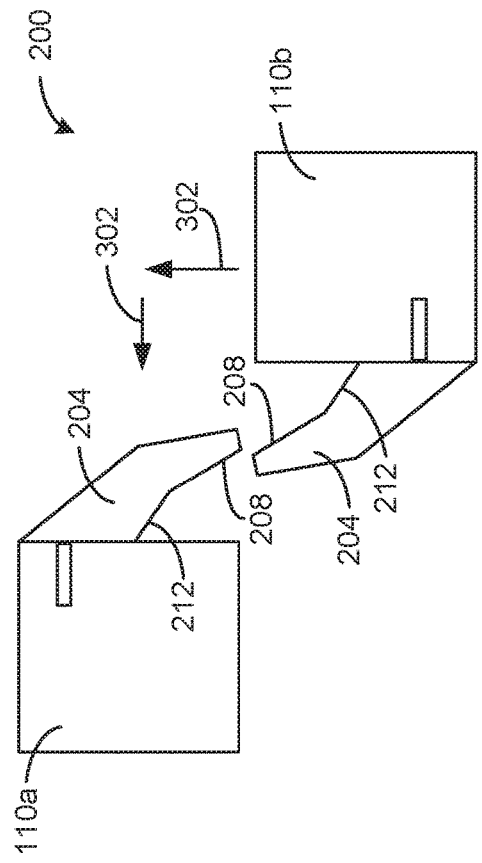

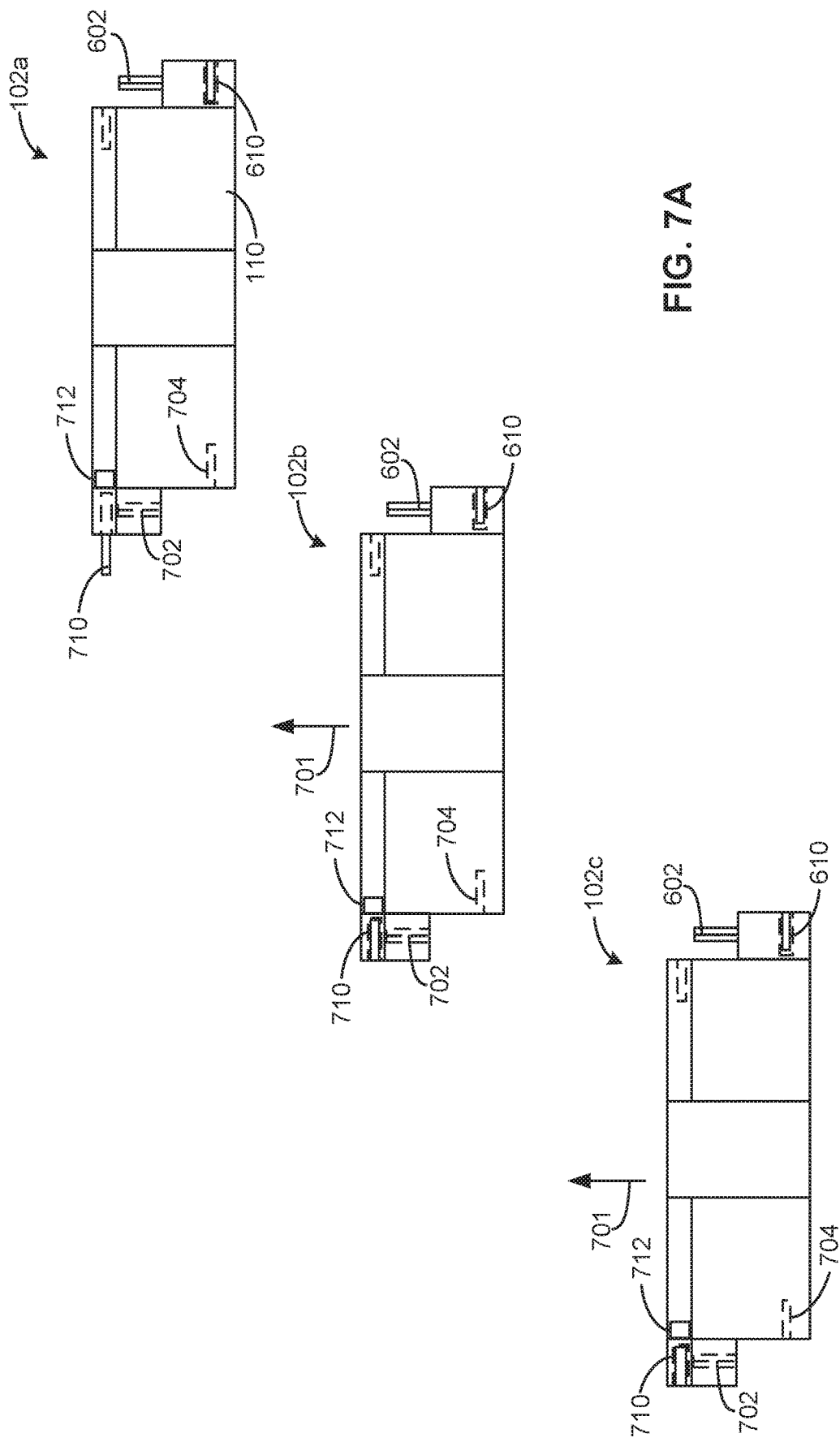

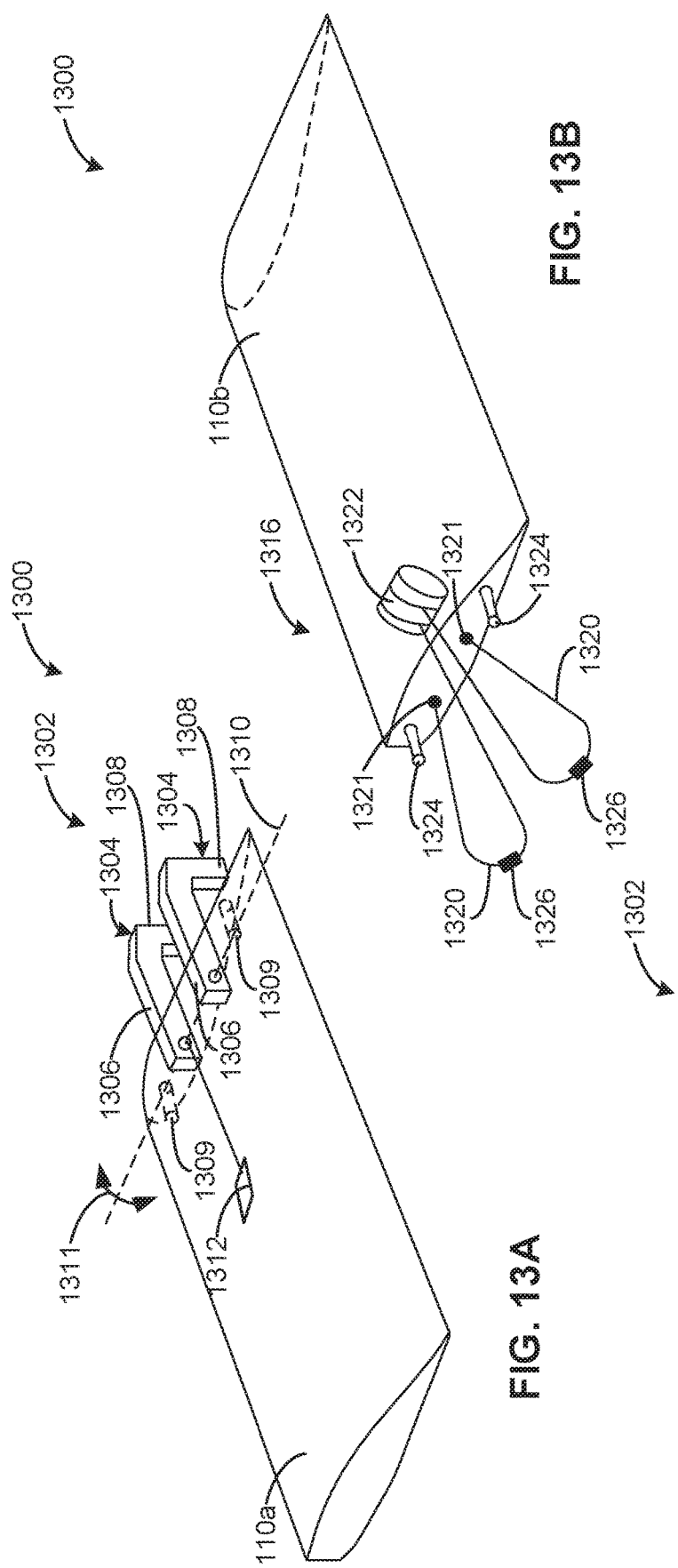
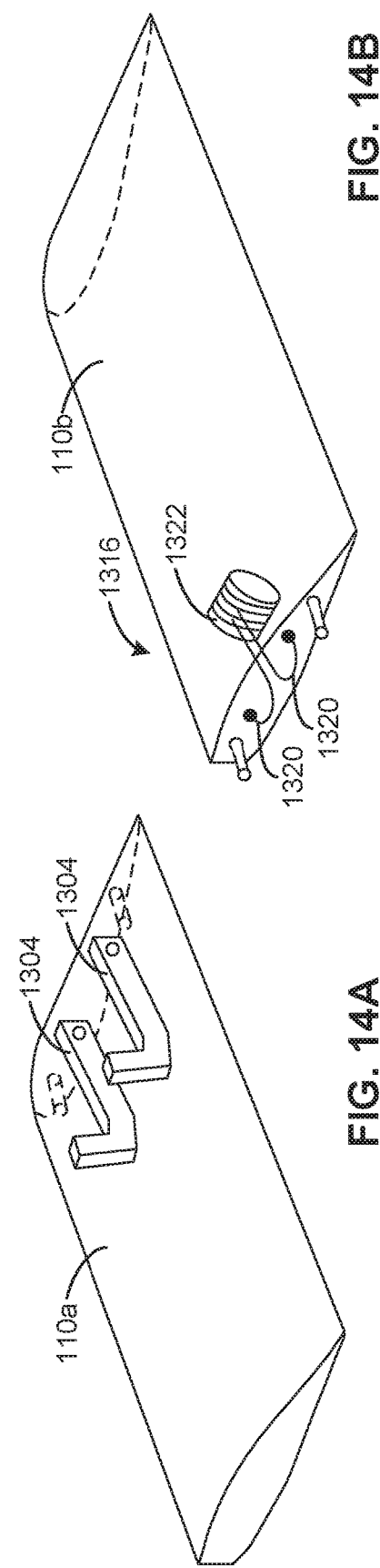

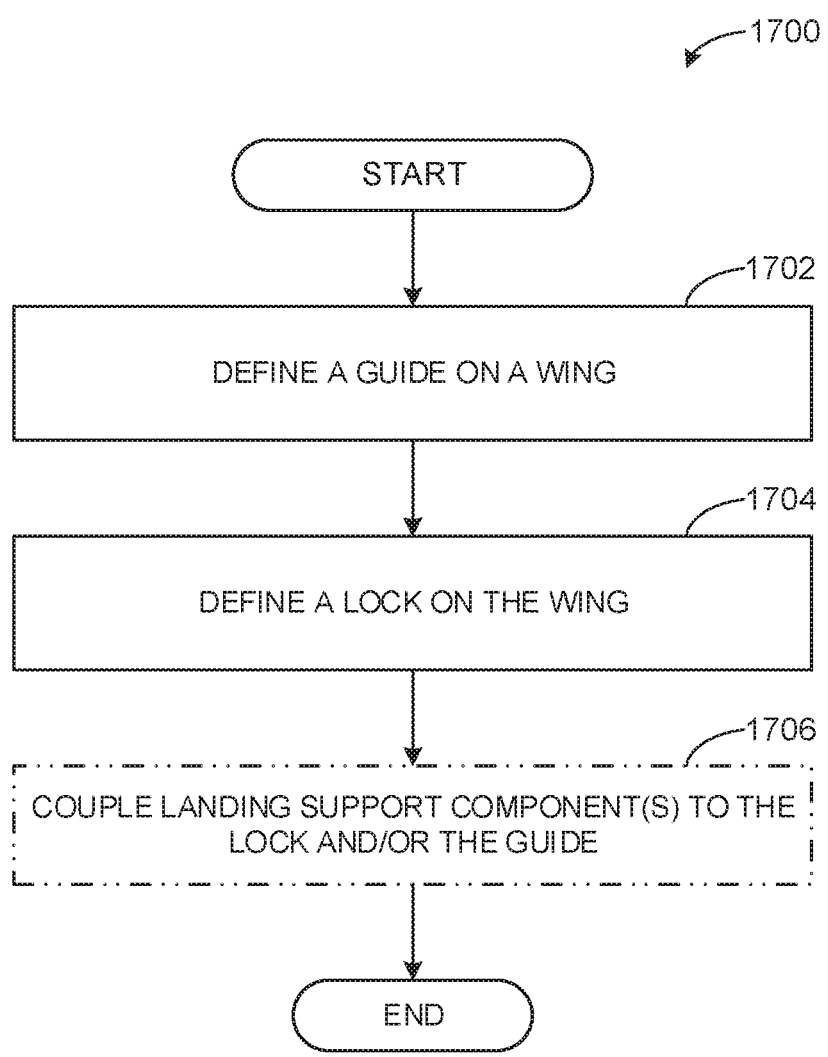

METHODS AND APPARATUS TO ALIGN AND SECURE AIRCRAFT

FIELD OF THE DISCLOSURE

This disclosure relates generally to aircraft and, more particularly, to methods and apparatus to align and secure aircraft.

BACKGROUND

In recent years, some small unmanned aircraft have been used to deliver items/packages, while other unmanned aircraft have been utilized in surveillance. However, some known unmanned aircraft have limited ranges and, thus, may be more frequently refueled, thereby decreasing their potential flight time (e.g., flight uptime). Further, load capacity capabilities may be limited with these unmanned aircraft. As a solution to the limited ranges and/or load capacity offered by some unmanned aircraft, securing multiple individual unmanned aircraft together can provide aerodynamic advantages, thereby increasing an operating range or load capacity of the unmanned aircraft. In particular, securing multiple fixed wing aircraft together along their respective wing span lengths can effectively define a large wingspan aircraft.

However, securing multiple aircraft together has proven to be a challenge in the air. In particular, flight parameters, such as air movement (e.g., winds, gusts, etc.), as well as relatively unpredictable motion of the aircraft can render aligning aircraft during flight challenging. Further, the level of coordination between such systems can lengthen the amount of time to properly align the aircraft.

BRIEF DESCRIPTION OF THE DRAWINGS

FIGS. 2A and 2B are perspective views of an example aircraft coupling apparatus that can be used with the aircraft shown in FIG. 1.

FIG. 3 is an overhead view of the example aircraft coupling apparatus of FIGS. 2A and 2B, depicted in a separated condition.

FIG. 7A depicts alignment of the example aircraft coupling apparatus of FIG. 6.

FIGS. 13A and 13B are perspective views of another example aircraft coupling apparatus that can be used with the aircraft of FIG. 1.

FIGS. 14A and 14B are perspective views of the example aircraft coupling apparatus of FIGS. 13A and 13B, shown in a secured position.

FIG. 17 is a flowchart representative of an example method for making the aircraft of FIG. 1 having the aircraft coupling apparatus of FIGS. 1-15D.

Figure 1:
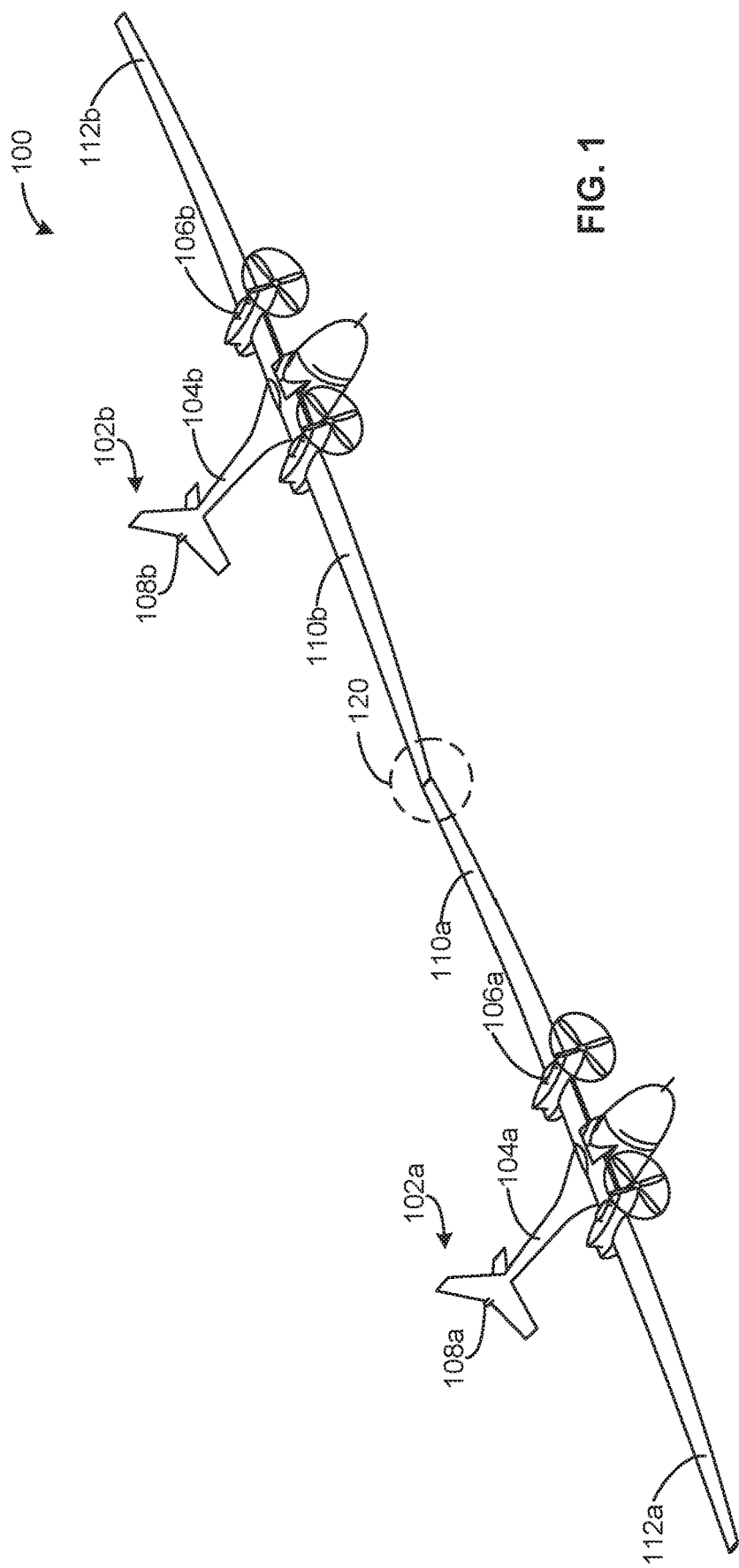
FIG. 1 is a top perspective view of an example aircraft configuration in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

SUMMARY

An example apparatus for securing a first aircraft to a second aircraft includes a guide configured to direct movement of a first wing of the first aircraft relative to a second wing of the second aircraft to align the first wing with the second wing, and a lock configured to secure the first wing to the second wing after the guide aligns the first wing to the second wing.

An example aircraft includes a first wing having a first guide, a second wing having a second guide, where the first and second guides are configured to guide the aircraft to be aligned with a second and a third aircraft during flight or hovering of the aircraft, a first lock coupled to the first wing, where the first lock is configured to secure the first wing to a third wing of the second aircraft, and a second lock coupled to the second wing, where the second lock is configured to secure the second wing to a fourth wing of the third aircraft.

An example method for securing a first aircraft to a second aircraft includes contacting a first guide of a first wing of the first aircraft to a second guide of a second wing of the second aircraft, where engagement of the first guide to the second guide aligns the first wing with the second wing. The example method also includes securing, via a lock, the first wing to the second wing after the engagement of the first and second guides aligns the first wing to the second wing.

Another example apparatus for securing a first aircraft to a second aircraft includes means for aligning a first wing of the first aircraft to a second wing of the second aircraft, and means for securing the first wing to the second wing after the means for aligning aligns the first wing to the second wing.

Another example method for producing an aircraft includes defining a guide on a first wing, wherein the guide is to guide movement of the first wing towards a second wing, and defining a lock on the first wing to secure the first wing to the second wing when the first and second wings are aligned by the guide.

DETAILED DESCRIPTION

Methods and apparatus to align and secure aircraft are disclosed. Multiple aircraft can be secured together to yield aerodynamic benefits. In particular, securing the aircraft together at their respective wings can increase aerodynamic efficiency in comparison to the individual aircraft flying separately by increasing an overall aspect ratio of the wings. In other words, a relatively larger continuous aerodynamic surface may be defined.

The examples disclosed herein can provide quick and accurate alignment of multiple aircraft (e.g., during flight and/or hovering). In particular, the examples disclosed herein utilize a guide or alignment device to align wings of different aircraft to one another during flight so that a lock or restraint mechanism can be used to secure the wings together. Accordingly, the examples disclosed herein can be effectively implemented with unmanned vehicles (e.g., unmanned aerial vehicles (UAVs), unmanned fixed-wing aircraft, drones, etc.) that may be secured together to travel to a target zone or task area, detached to perform required functions separate from one another, and then secured together to return, thereby saving fuel and/or increasing potential cargo capacity in comparison to the unmanned vehicles flying separately.

In at least one example disclosed herein, the guide includes a contoured or asymmetric winglet that is angled in multiple directions (e.g., a winglet contoured or curved about multiple different coordinate axes). In particular, the winglet may include a shallow-angled distal portion and a steep/oblique-angled base portion that is proximate a respective wing. In another example, the guide includes a keyed extension rod to be received by a respective keyed opening. In another example, the guide and the lock includes a rotatable paddle of a first wing that is inserted into an opening of a second wing and rotated to secure the first wing to the second wing. In such examples, the rotatable paddle may also function as a landing structure. In another example, a hook of a first wing is received by a retractable loop of a second wing. Additionally or alternatively, a pin that is actuated or moved into a socket by an actuator or solenoid (e.g., an actuated pin) is implemented to secure the wings together.

As used herein, the terms "guide" or "alignment device" refer to a component, feature, and/or assembly used to align a first component to a second component. Accordingly, the terms "guide" or "alignment device" can encompass a component, feature(s), a combination of engaging features, an assembly and/or a combination of multiple components, surfaces, and/or assemblies encompassing one or both of the first and second components.

As used herein, the terms "lock" or "restraint mechanism" refer to a component, feature, and/or assembly used to secure the first component to the second component. As used herein, the term "actuated" in the context of a component refers to a component that is moved by an actuator, a solenoid, or any appropriate movement device/mechanism. As used herein, the terms "securing" or "secure" refer to locking, interlocking, and/or rigidly joining two objects together. As used herein, the terms "coupling" or "couple" refer to joining two objects together, directly or indirectly joined to with another element/node/feature, and may not necessarily mean mechanically.

FIG. 1 is a top perspective view of an aircraft configuration 100 in which the examples disclosed herein may be implemented. The example aircraft configuration 100 includes multiple aircraft 102 (including, for example, a first aircraft 102a and a second aircraft 102b) secured together. According to the illustrated example, each of the aircraft 102 includes a fuselage 104 (including, for example, a first fuselage 104a and a second fuselage 104b), engines 106 (including, for example, a first engine 106a and a second engine 106b), a tail section 108 (including, for example, a first tail section 108a and a second tail section 108b), and wings 110 (including, for example, a first wing 110a and a second wing 110b). Further, each of the example aircraft 102a, 102b include wings 112a, 112b, respectively. In some examples, the wing 112a is identical to the wing 110b. Likewise, the wing 112b may be identical to the wing 110a.

To improve aerodynamic performance beyond that of one of the aircraft 102, the first and second aircraft 102a, 102b are secured together at an interface 120 (e.g., a coupling interface, a coupling joint, etc.) defined at distal ends of both of the first and second wings 110a, 110b. Accordingly, the combination of the first and second aircraft 102a, 102b can enable an increase in effective wingspan to thereby improve lift characteristics and/or reduce an overall drag coefficient. In this example, the wings 112a, 112b are not secured to other aircraft.

The examples disclosed herein enable the first and second aircraft 102a, 102b to be aligned and secure together with relative ease by providing alignment and/or guiding features, as well as a restraint or locking system that works in tandem with the alignment and/or guiding features to enable securing of the first and second aircraft 102a, 102b to one another. The examples disclosed herein enable multiple aircraft (e.g., greater than two aircraft) to be secured together in series by facilitating ease of alignment.

While the example first and second aircraft 102a, 102b are shown arranged laterally to one another by way of the first and second wings 110a, 110b in this example, the aircraft 102 may be arranged in any appropriate configuration using the examples disclosed herein. For example, two or more aircraft 102 can be arranged and/or secured together in a delta configuration, a top-to-bottom arrangement, secured-fuselage arrangement, a front-to-back arrangement, etc. Further, the examples disclosed herein may be implemented on any appropriate vehicle and/or aircraft structure including, but not limited to, a fuselage, a tail section, engines, fins, a canard, etc. In other words, the examples disclosed herein may implemented on any appropriate attachment point(s) or structure(s) to secure multiple vehicles (e.g., land vehicles, watercraft, submersibles, etc.) together.

FIGS. 2A and 2B illustrate an example aircraft coupling apparatus 200 in accordance with the teachings of this disclosure. Turning to FIG. 2A, the first wing 110a of the first aircraft 102a includes a guide 202 (e.g., an alignment device, an alignment contour, an alignment foil, an asymmetric alignment device, etc.) attached thereto. The guide 202 of the illustrated example includes two angled and/or curved contoured upper and lower winglets 204 (e.g., contoured winglets, angled winglets, curved winglets, etc.). The example winglets 204 each include a distal portion 208 and a base 206. The base 206 is attached to the first wing 110a and extends to the distal portion 208. In this example, the distal portion 208 includes a distal shallow angle portion 210. For example, a "shallow" angle can be approximately 0 to 15 degrees in some applications relative to an external surface of the wing 110. The base 206 includes a steep angle portion 212. For example, a "steep" angle can be approximately 10 to 45 degrees relative to an external surface of the wing 110 in some applications. While example "shallow" and "steep" angles are given, the angles may be implemented at any appropriate range based on application, intended aircraft performance and/or anticipated flight condition(s). In this example, the first wing 110a also includes openings 211 (e.g., sockets, internal openings, receptacles, etc.). The openings 211 may be implemented as recesses or a hole that penetrates an entire component, assembly and/or surface.

Turning to FIG. 2B, the example second wing 110b of the second aircraft 102b includes the guide 202 having the corresponding upper and lower winglets 204. In particular, the winglets 204 face in an opposing direction to the winglets 204 of the first wing 110a and, thus, the distal portions 208 of each of the winglets 204 of the wings 110a, 110b face towards each other. As can also be seen in the illustrated example of FIG. 2, the aircraft coupling apparatus 200 includes a restraint mechanism 214, such as a lock. As one example, the restraint mechanism 214 includes rods 216 (e.g., extension pins, rods, male retention extension, actuated rods, etc.) that are moved by an actuator 217. In some examples, a sensor 218 is coupled to and/or disposed within the second wing 110b. The sensor 218 can be a proximity sensor To facilitate alignment of the first wing 110a of the first aircraft 102a to the second wing 110b of the second aircraft 102b, the example guides 202 of the wings 110a, 110b cause the wings 110a, 110b to move toward one another when the guides 202 are brought within a sufficient proximity of one another so that surfaces of the winglets 204 engage one another, thereby guiding movement of the winglets 204 with respect to each other. This relative movement of the wings 110a, 110b occurs when the second wing 110b is moved toward the first wing 110a in a direction generally indicated by an arrow 220. In particular, when the winglets 204 of the corresponding wings 110a, 110b are brought within a general proximity of one another, the shallow angle portions 210 of the opposing distal portions 208 first engage one another and guide movement of the wings 110a, 110b towards one another. In turn, as the wings 110a, 110b continue to move toward one another, the corresponding steep angle portions 212 of the respective bases 206 guide final movement of the wings 110a, 110b until the wings are brought into final alignment positions (e.g., the wings 110a, 110b are brought into their final aligned positions).

To secure the wings 110a, 110b to one another once the winglets 204 are sufficiently aligned (e.g., aligned within a requisite degree of error, fully aligned, fully seated to one another, etc.) by the winglets 204, at least one of the rods 216 is extended into the corresponding openings 211 of the opposing first wing 110a by the actuator 217, thereby preventing relative motion of the wings 110a, 110b. In this example, the rods 216 are moved into the opening(s) 211 when the sensor 218 of the illustrated example detects sufficient alignment between the wings 110a, 110b and/or the winglets 204. Additionally or alternatively, the sensor 218 detects alignment of at least one of the rods 216 in relationship to the corresponding opening 211 to determine whether there is sufficient alignment. In other examples, the sensor 218 uses optical markers or other indicators to determine the alignment of the rod(s) 216 to the opening(s) 211. In some examples, there are two operational modes of the sensor 218. The first operational mode is an "independent mode" in which the sensor 218 is turned off. The second mode is the "Docking Mode" in which all or a majority of sensors are operational to assist in the alignment and connection of the first and second aircraft 102a, 102b.

In some examples, each of the wings 110a, 110b includes at least one of the rods 216. In such examples, the wings 110a, 110b extend their respective rods 216 into the corresponding opposed openings 211. While the example winglets 204 shown in FIGS. 2A and 2B exhibit relatively linear or straight segments in the shallow angle portion 210 and the steep angle portions 212, the example shallow angle portions 210 and/or the steep angle portions 212 may be instead implemented as multiple arcuate or curved segments. In other words, shallow angle portions 210 and/or the steep angle portions 212 can exhibit curvature and/or curved transitions therebetween. Additionally or alternatively, the winglets 204 are rotated by the actuator 217 to further facilitate relative alignment of the winglets 204.

FIG. 3 is an overhead view of the example aircraft coupling apparatus 200 of FIGS. 2A and 2B, depicted in a separated condition. As can be seen in the view of FIG. 3, an engagement of both of the winglets 204 results in movement generally indicated by arrows 302. In particular, engagement of the distal portions 208 of the wings 110a, 110b involves a relatively smaller degree of inward motion in comparison to an inward motion caused by engagement of both of the steep angle portions 212.

Figure 4:
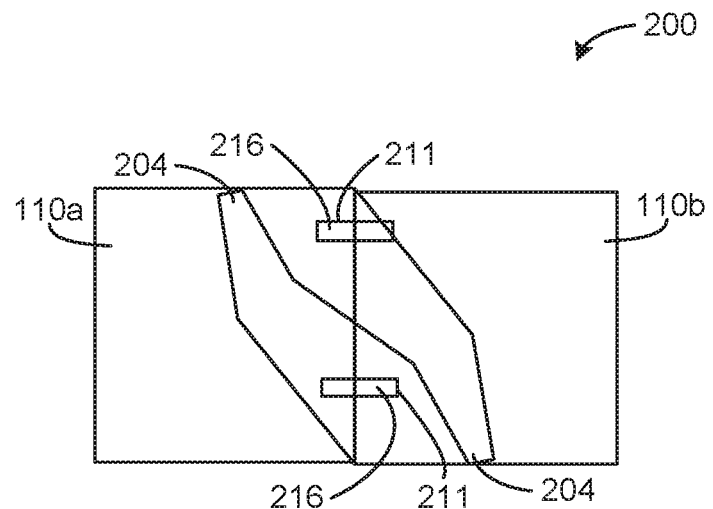
FIG. 4 is another overhead view of the example aircraft coupling apparatus of FIGS. 2A-3, depicted in a secured condition.

FIG. 4 is another overhead view of the example aircraft coupling apparatus 200 of FIGS. 2A, 2B and 3, but depicted in a secured condition. In this example, full engagement of the winglets 204 prevents lateral movement (sideways movement in the view of FIG. 4) of the wings 110a, 110b relative to one another while extending at least one of the rods 216 into the corresponding openings 211 prevents forward and rearward movement (upward and downward, or vertical, movement in the view of FIG. 4) of the wings 110a, 110b.

Figure 5:
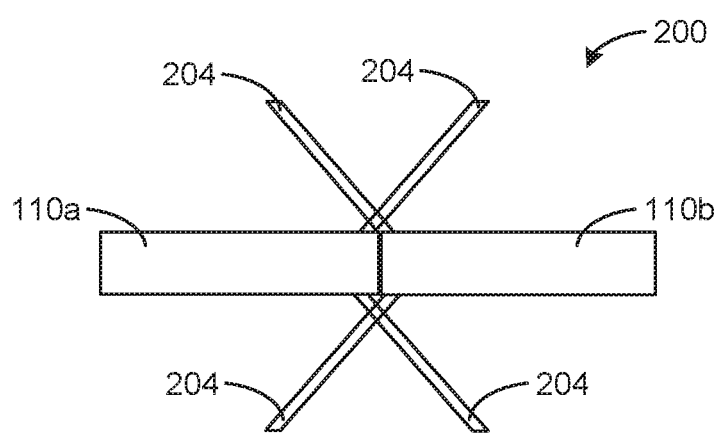
FIG. 5 is a front/rear view of the example aircraft coupling apparatus of FIGS. 2A-4 shown in the secured condition.

FIG. 5 is a front/rear view of the example aircraft coupling apparatus 200 of FIGS. 2A, 2B, 3 and 4 shown in the secured condition. As can be seen in the illustrated example of FIG. 5, the relative arrangement of the winglets 204 resembles a general X-shaped intertwining cross pattern when the wings 110a, 110b are secured together. In this example, the relative arrangement of the winglets 204 can impose little to no drag penalty when the winglets 204 are fully engaged. In other words, the winglets 204 of the illustrated example not only function to facilitate alignment and securing of the wings 110a, 110b, but can also provide favorable aerodynamic properties when the corresponding aircraft 102a, 102b are secured together.

Figure 6:
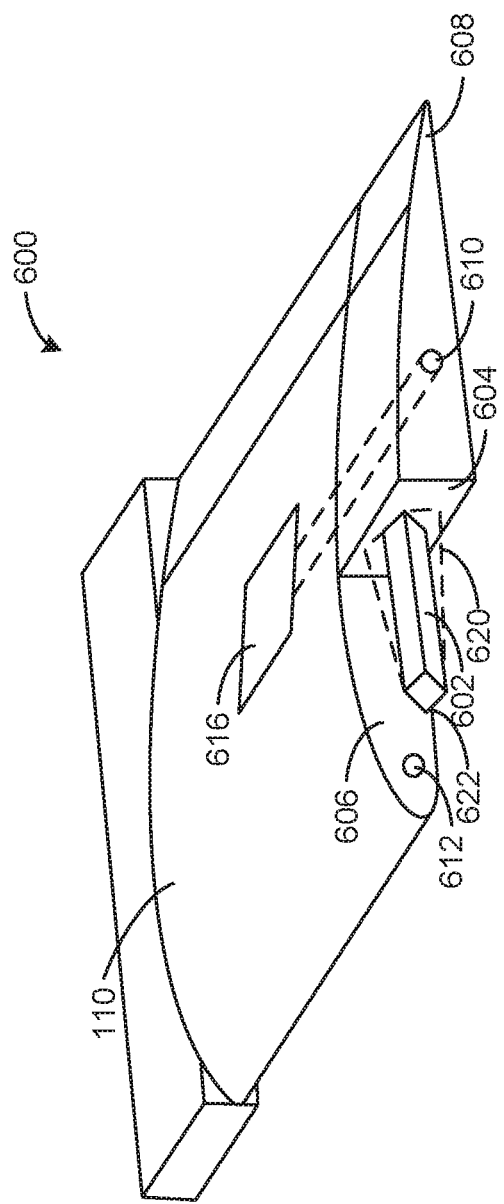
FIG. 6 is a perspective view of another example aircraft coupling apparatus that can be used with the aircraft shown in FIG. 1.

FIG. 6 is a perspective view of another example aircraft coupling apparatus 600 that can be used with the aircraft 102 of FIG. 1. The aircraft coupling apparatus 600 of the illustrated example is implemented on the example wing 110. In this example, the wing 110 includes a first engagement surface 604 and a second engagement surface 606 that is perpendicular to the first engagement surface 604. The aircraft coupling apparatus 600 includes a keyed rod 602 that extends from the first engagement surface 604. The second engagement surface 606 extends along a longitudinal length of the keyed rod 602. In this example, the wing 110 includes a third engagement surface 608, and the aircraft coupling apparatus 600 also includes a pin 610 (e.g., an actuated pin), a socket opening 612, and an actuator 616 (i.e., a solenoid).

Figure 7B:
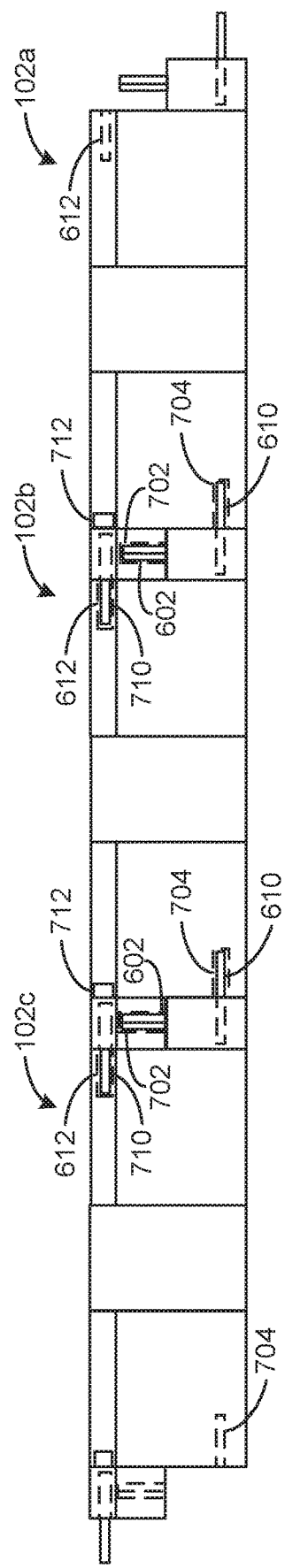
FIG. 7B depicts engagement of the example aircraft coupling apparatus of FIG. 6.

The keyed rod 602, has a square, rectangular, parallelogram, or diamond-shaped cross-sectional profile in this example. Accordingly, the keyed rod 602 acts as a guide that controls both rotation and translation as the keyed rod 602 extends into a keyed socket 702 (shown in FIGS. 7A and 7B) when the wing 110 is brought into engagement with another wing 110. Further, the pin 610 is moved by the actuator 616 to extend into a corresponding socket 704 that is shown in FIGS. 7A and 7B. In some examples, the pin 610 is caused to move by a solenoid as the actuator 616.

In some other examples, the keyed rod 602 has a taper 620 in which the cross-sectional area of the keyed rod 602 near the first engagement surface 604 is larger than the cross-sectional area of the keyed rod 602 at a free end 622. The taper 620 facilitates alignment of the keyed rod 602 in the keyed socket 702 with any potential mismatches, thereby enabling guided engagement to properly center the keyed rod 602 to the keyed socket 702 as the keyed rod 602 is moved further into a depth of the keyed socket 702. In other words, the taper 620 can mitigate any initial positional mismatch that may be present. In this example, the keyed rod 602 has a diamond-shaped cross-sectional profile. However, any appropriate cross-sectional profile may be implemented, including, but not limited to, a cross-shaped profile, a triangular profile, a star-shaped profile, an irregular or keyed circle profile, a slit profile, a hexagonal-shaped profile, polygonal-shaped profile, etc.

FIG. 7A depicts alignment of multiple ones of the example aircraft 102a, 102b, 102c using the example coupling apparatus 600 of FIG. 6. In particular, FIG. 7A depicts three of the aircraft 102a, 102b, 102c in the process of being secured together. In this example, two of the aircraft 102b, 102c are moving in directions generally indicated by arrows 701 relative to the rightmost aircraft 102a (in the view of FIG. 7A). According to the illustrated example, the rightmost aircraft 102a is to be first secured to the middle aircraft 102b. Finally, the leftmost aircraft 102c is to be secured to the middle aircraft 102b. Additionally or alternatively, additional ones of the aircraft 102 may be added to the right of the rightmost aircraft 102a. This process may repeat until a desired number of aircraft 102 are secured together (e.g., five, ten, twenty, fifty, etc.) along a lateral direction of the wings 110.

According to the illustrated example, as the aircraft 102a, 102b, 102c are being aligned to one another and/or sequentially aligned, pins 710 as well as the pins 610 are placed into their retracted positions by respective actuators 712 (i.e., solenoids). In this example, the keyed rods 602 are generally aligned to corresponding keyed sockets 702 so that the pins 610 may be inserted into sockets 704.

FIG. 7B depicts engagement of the example aircraft 102a, 102b, 102c using the example aircraft coupling apparatus 600 of FIG. 6. As can be seen in the illustrated example of FIG. 7B, the keyed rods 602 are inserted into the corresponding keyed sockets 702 and the pins 610 are extended by the actuator 616 of FIG. 6 into the corresponding sockets 704. Further, the pins 710 are moved by the respective actuators 712 to extend into the corresponding socket openings 612.

Figure 8:
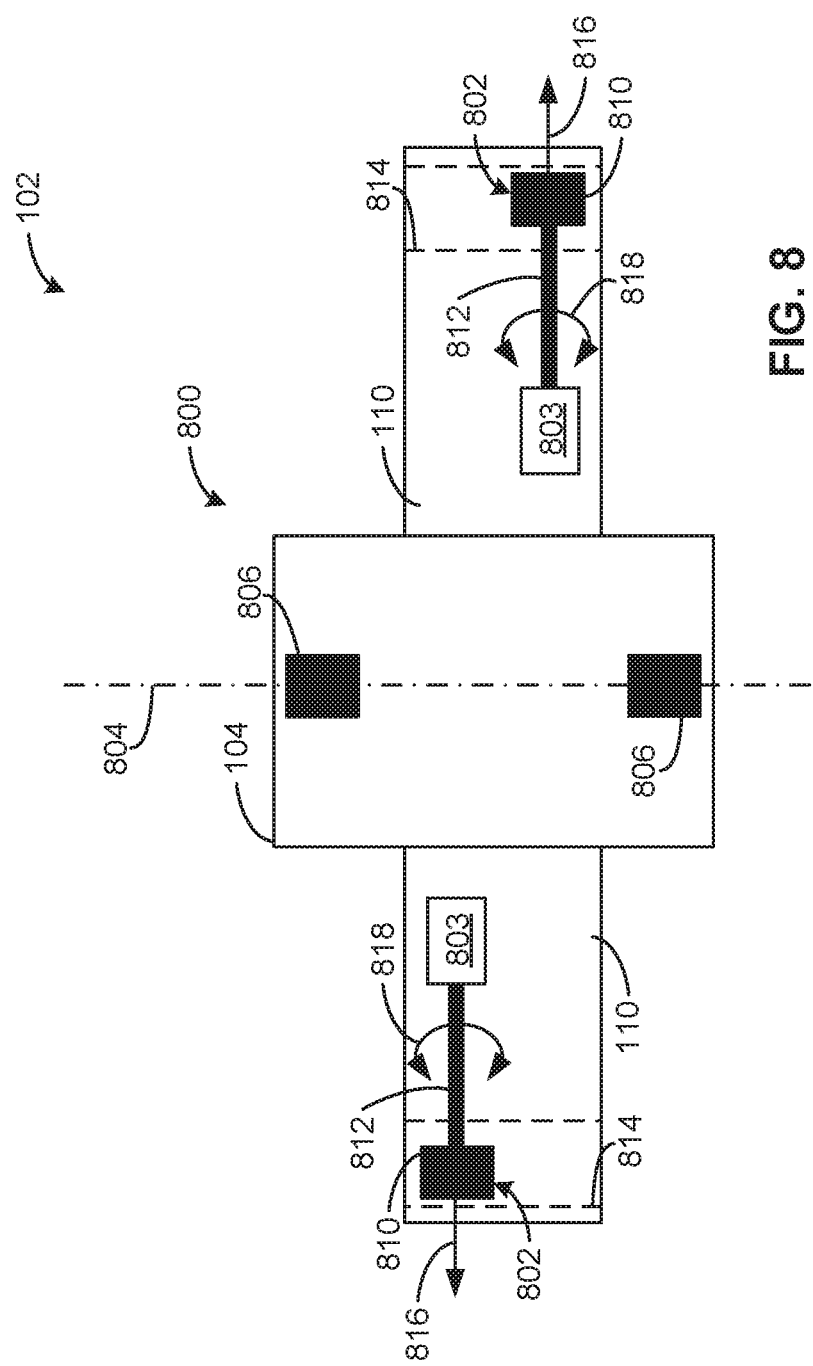
FIG. 8 is a top schematic view of another example aircraft coupling apparatus that can be used with the aircraft of FIG. 1.

FIG. 8 is a top schematic view of another example aircraft coupling apparatus 800 that can be used with the aircraft 102 of FIG. 1. According to the illustrated example of FIG. 8, the example aircraft coupling apparatus 800 includes paddles 802 (e.g., guide paddles, rotatable paddles) that are disposed within the respective wings 110 of the aircraft 102 and actuators 803 operatively coupled to the respective paddles 802. In this example, the paddles 802 are asymmetrically arranged relative to a center axis 804 (e.g., a longitudinal center axis) corresponding to the fuselage 104, thereby enabling mechanically robust dual couplings on each of the wings 110. Further, in this example, the fuselage 104 also includes mid-body landing support flaps 806.

Each of the paddles 802 of the illustrated example act as a guide and includes a locking portion 810 (e.g., a flat portion, an interlocking portion, an engaging portion, etc.) and a rotatable shaft 812. The example locking portion 810, as well as a portion of the rotatable shaft 812, are disposed or stowed within a respective cavity 814 (e.g., a locking cavity, an engaging cavity, a channel) of the wing 110. In this example, the paddles 802 do not extend out of any external aerodynamic surface of the respective wings 110 during an unsecured condition.

In operation and as will be discussed in greater detail below in connection with FIGS. 9A-10, the paddles 802 of the illustrated example can be moved to extend laterally from the respective wings 110 in directions generally indicated by arrows 816 into another wing 110 of another aircraft 102. Once the paddles 802 have been extended out of their respective wings 110, the example paddles 802 are rotated in a direction generally indicated by arrows 818 to interlock with the other wings 110 to be secured thereto.

While the paddles 802 are shown on both sides of the aircraft 102 in this example, in some examples, only one side of the aircraft 102 includes one of the paddles 802 while another side of the aircraft 102 is to receive one of the paddles 802. While the paddles 802 are shown generally depicted as having a flat rectangular shape, the paddles 802 may be contoured, curved, and/or keyed to align and secure with a corresponding feature or structure of a corresponding wing 110 into which the paddles 802 are extended.

Figure 9A:
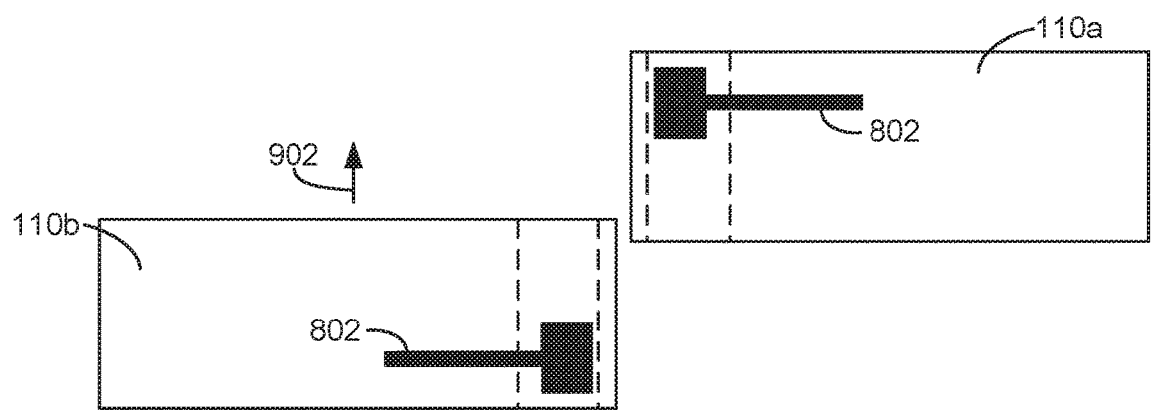
FIGS. 9A-9C are top schematic views that depict engagement steps of the example aircraft coupling apparatus of FIG. 8.
Figure 9B:
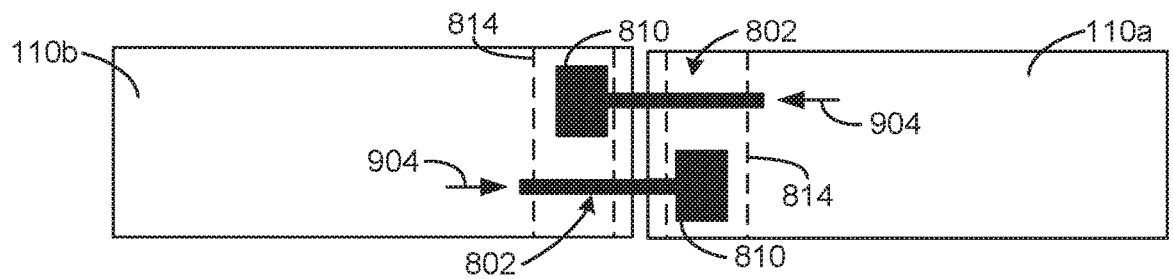
Figure 9C:
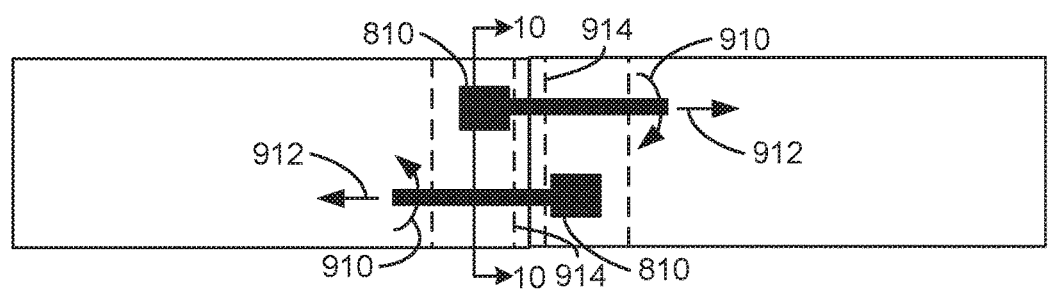

FIGS. 9A-9C are top schematic views that depict engagement steps of the example aircraft coupling apparatus 800 of FIG. 8. Turning to FIG. 9A, two separate wings 110a, 110b of different aircraft 102a, 102b are shown being moved into proximity of one another. In this example, the leftmost wing 110b (in the view of FIG. 9A) is moving relative to the rightmost wing 110a in a direction generally indicated by an arrow 902. Accordingly, the wings 110a, 110b shown may be aligned during flight or hovering. In the view of FIG. 9A, the paddles 802 are retracted to be disposed within their respective wings 110a, 110b.

FIG. 9B depicts both of the wings 110a, 110b generally aligned in a vertical direction (of FIG. 9B). According to the illustrated example, the paddles 802 are extended into respective others of the wings 110a, 110b in a direction generally indicated by arrows 904 until the locking portions 810 extend into the cavities 814 of the other wings 110.

Turning to FIG. 9C, the paddles 802 are each rotated in a direction generally indicated by arrows 910 to secure both of the wings 110a, 110b together. In particular, the paddles 802 are rotated until the locking portions 810 contact a surface of the cavities 814. In some examples, the paddles 802 are also moved laterally along a direction generally indicated by arrows 912 back towards the wings 110a, 110b they were extended from. Accordingly, the wings 110a, 110b are restrained in a lateral direction by causing each of the locking portions 810 to contact a lateral surface 914 (e.g., a lateral locking surface).

Figure 10:
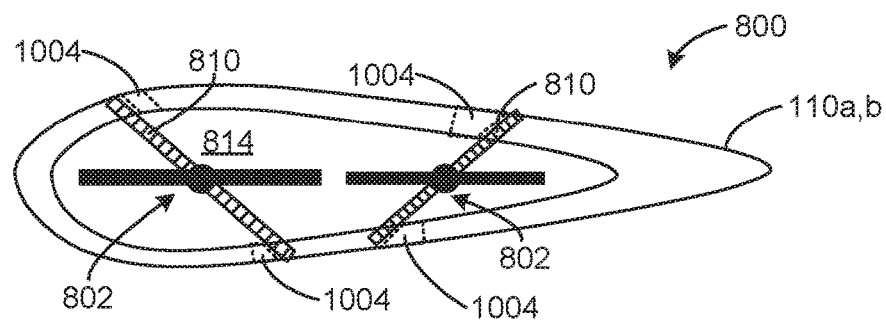
FIG. 10 is a side cross-sectional view along the line 10-10 of FIG. 9C showing the example landing structure of FIGS. 8-9C shown in a secured position.

FIG. 10 is a side cross-sectional view along the line 10-10 of FIG. 9C showing the example aircraft coupling apparatus 800 of FIG. 8-9C in the secured position (e.g., the wings 110a, 110b are rigidly secured to one another). In this example, the paddles 802 are shown in multiple orientations (for clarity). In particular, the paddles 802 depicted in solid shading are oriented at their initial rotational angles during or before insertion into the cavity 814 while the paddles 802 depicted with striped pattern shading are shown rotated to their respective secured positions within the cavity 814. In particular, the rotated pattern paddles 802 (shown in the striped pattern) of the illustrated example are shown with the locking portions 810 engaging stops 1004 (e.g., engagement stops, interlocking stops, etc.). In particular, the stops 1004 are angled and/or contoured to engage the respective locking portions 810.

In some examples, the stops 1004 are defined by internal surfaces and/or edges of the cavity 814. Additionally or alternatively, the stops 1004 are integral with the lateral surface 914 of FIG. 9C. In other examples, the paddles 802 are inserted into slotted openings of the wing 110 to be disposed within the cavity 814.

Figure 11:
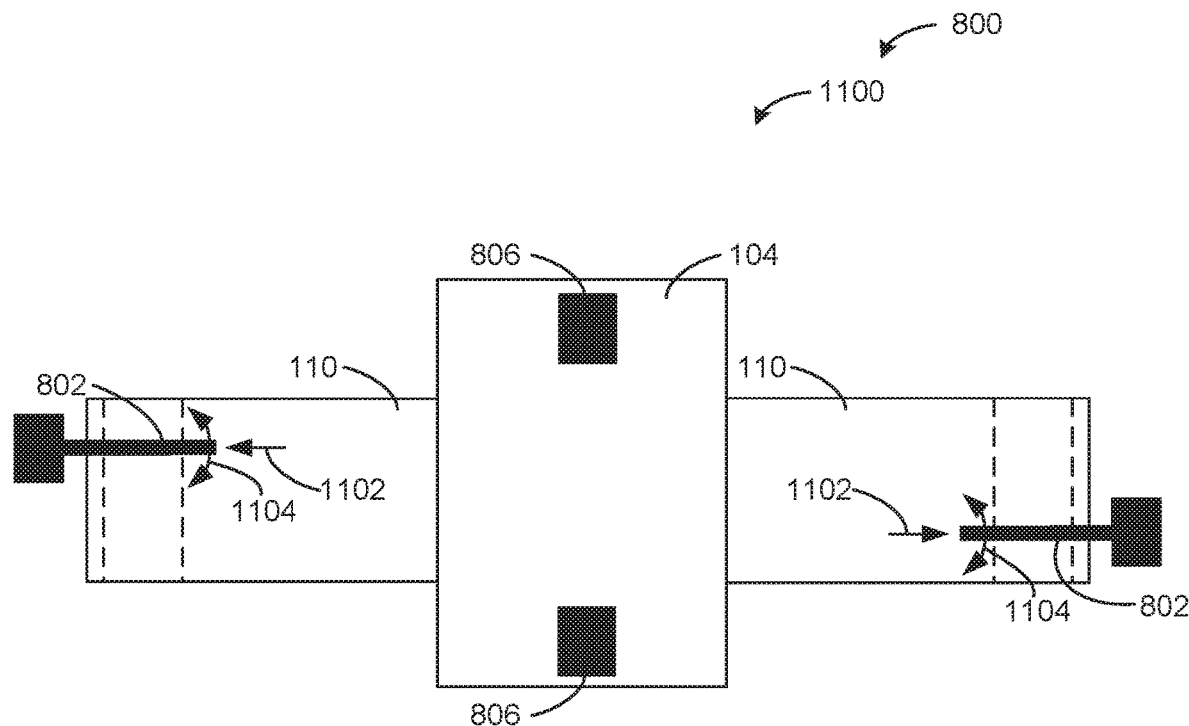
FIG. 11 is a top schematic view of an example landing structure that may be implemented in the example aircraft coupling apparatus of FIGS. 8-10.

FIG. 11 is an overhead view of an example landing structure 1100 (e.g., a landing support, a landing gear, etc.) that may be implemented in the example aircraft coupling apparatus 800 of FIGS. 8-10. The landing structure 1100 includes the support flaps 806 and the paddles 802. The support flaps 806 are rotatably coupled to the fuselage 104 of the aircraft 102. In some examples, the landing support flaps 806 are disposed on the wings 110 (e.g., rear and front portions of the wings 110). In one example, the support flaps 806 exhibit a similar overall geometry and/or dimensions to the paddles 802 and, thus, rotate in a similar manner to the paddles 802 to also extend towards the ground. According to the illustrated example, the paddles 802 are shown extending out of the corresponding first and second wings 110 when the first and second wings 110 are not secured to other wings 110 (i.e., third and fourth wings of third and fourth aircraft, respectively). In other words, the example landing structure 1100 depicts an additional use and/or configuration of the example coupling apparatus 800 of FIGS. 8-10.

To provide an integrated landing capability, the paddles 802 of the illustrated example are extended out of the corresponding wings 110, as indicated by arrows 1102. In particular, the example paddles 802 are rotated in a direction generally indicated by arrows 1104 to a predetermined orientation, by which a corresponding ground contacting edge or surface of each of the paddles 802 is perpendicular to the ground in this example. Accordingly, the paddles 802 are extended towards the ground so that the weight of the aircraft 102 can be at least partially supported by the paddles 802. In some examples, to further support the weight of the aircraft 102, the support flaps 806 rotate with respect to the fuselage 104 to be at a predetermined orientation with respect to the ground (i.e., a ground contacting edge or surface of the support flap 806 has a perpendicular orientation relative to the ground).

In some examples, the paddles 802 and/or the support flaps 806 define or include wheels (e.g., wheel structures, wheel struts, etc.) or other movement facilitating structures to soften impact of the aircraft 102 when the aircraft lands. Accordingly, movement of the aircraft 102 is facilitated on the ground.

Figure 12:
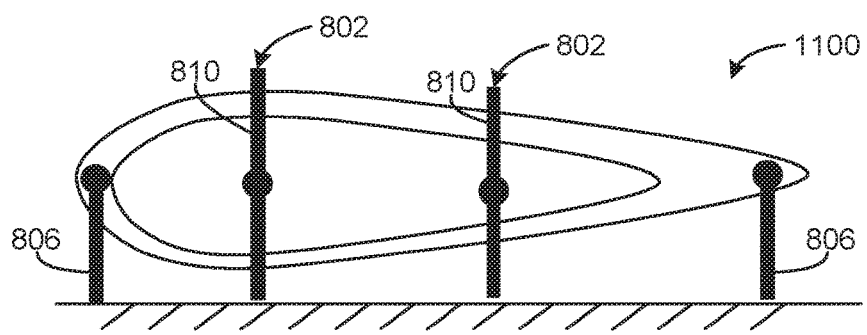
FIG. 12 is a side cross-sectional view of the example landing structure of FIG. 11 shown in an extended landing position.

FIG. 12 is a side cross-sectional view of the example landing structure 1100 of FIG. 11 shown in an extended landing position. As can be seen in the illustrated example of FIG. 12, both of the locking portions 810 of the paddles 802 are rotated to contact the ground. Further, the landing support flaps 806 are also deployed to contact the ground, which may thereby provide a stable support base of the aircraft 102.

FIGS. 13A and 13B are perspective views of another example aircraft coupling apparatus 1300 that may be used with the aircraft 102 of FIG. 1. Turning to FIG. 13A, a first coupling portion 1302 (e.g., a coupling half) implemented on the example wing 110a is shown in an aligning configuration. In particular, the first coupling portion 1302 includes hooks 1304 (e.g., rotatable hooks). Each hook 1304 includes a base 1306 and a distal contact portion 1308 that is substantially perpendicular to the base 1306. Further, the first coupling portion 1302 includes openings 1309. In this example, the openings 1309 are circular and/or round internal openings arranged outward relative to the hooks 1304. In other examples, the openings 1309 may be disposed external to the wing 110a. The example hooks 1304 can be caused to move to rotate about an axis 1310 in a direction generally indicated by an arrow 1311 by an actuator 1312, such as a solenoid. In other examples, the hooks 1304 are spring-loaded.

FIG. 13B illustrates a second coupling portion 1316 of the wing 110b that is configured to couple to the first coupling portion 1302 of the wing 110a (shown in FIG. 13A). In particular, the second coupling portion 1316 is configured to engage the first coupling portion 1302 to guide alignment of the wings 110a, 110b and secure the wings 110a, 110b together. According to the illustrated example, the second coupling portion 1316 includes a cable 1320 (e.g., a retractable cable) and alignment pins 1324. The cable 1320 is restrained at respective attachment joints 1321 (e.g., attachment loops) and extends from a reel 1322 (e.g., a rotatable reel). The example cable 1320 defines a number of loops corresponding to the number of hooks 1304 (shown in FIG. 13A). Accordingly, each loop is configured to engage a respective hook 1304 by at least partially surrounding the respective hook 1304.

In this example, the reel 1322 is disposed within the wing 110b. However, in other examples, the reel 1322 is external to the wing 110b. In other examples, the cable 1320 does not extend from the reel 1322. In such examples, the cable 1320 only loops between the attachment joints 1321 such that a tension and/or length of the cable 1320 is adjusted by a tension adjustment device 1326 (e.g., a loop buckle, a strap-type adjustment mechanism, etc.). In some examples, there is only a single loop defined by the cable 1320 and, thus, only one of the hooks 1304 of the first coupling portion 1302 may be implemented on the wing 110a to be retained by this single loop.

FIGS. 14A and 14B are perspective views of the example aircraft coupling apparatus 1300 of FIGS. 13A and 13B shown in a secured position. Turning to FIG. 14A, the hooks 1304 of the first coupling portion 1302 are rotated away from the distal end of the wing 110a. In some examples, the hooks 1304 are rotated to be disposed within an internal volume of the wing 110a, which may thereby prevent the hooks 1304 from negatively impacting aerodynamic properties during flight.

FIG. 14B illustrates the second coupling portion 1316 when the coupling apparatus 1300 is in the secured position. As can be seen in the view of FIG. 14B, a slack of the cable 1320 is reduced by the reel 1322 as an increasing amount of the cable 1320 is placed onto the reel 1322 (to effectively shorten the cable 1320) in contrast to the depiction of the cable 1320 shown in FIG. 13B. Alternatively, the tension adjustment device 1326 reduces the slack in the cable 1320 to transition the coupling apparatus 1300 into the secured position.

Figure 15A:
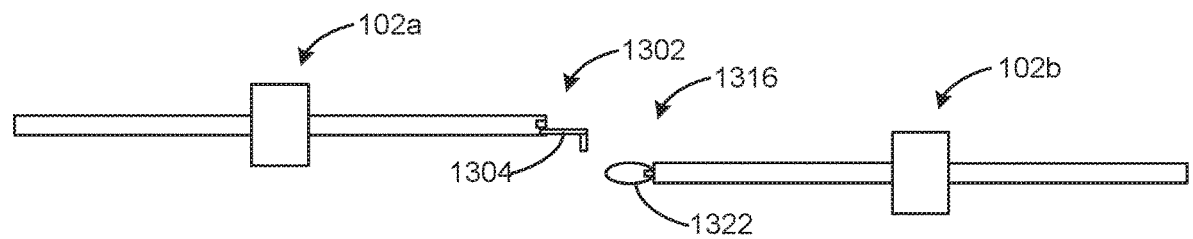
FIGS. 15A-15D are front schematic views that depict engagement steps of the example aircraft coupling apparatus of FIGS. 13A-14B.

FIGS. 15A-15D are front schematic views that depict engagement steps of the example aircraft coupling apparatus 1300 of FIGS. 13A-14B. FIG. 15A depicts two of the aircraft 102a, 102b moving and/or maneuvering to be in proximity of one another. In particular, the hook 1304 of the first coupling portion 1302 has been rotated outwards towards the cable 1320 of the second coupling portion 1316 while both of the aircraft 102*a*, 102*b* maneuver or hover towards each other.

Figure 15B:
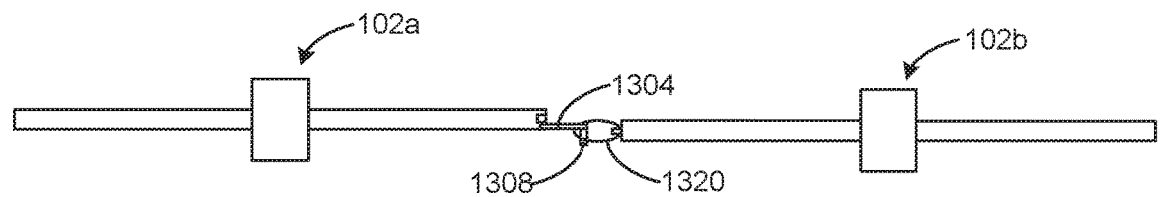

Turning to FIG. 15B, both of the aircraft 102*a*, 102*b* have been maneuvered so that the distal contact portion 1308 of the hook 1304 engages the cable 1320. In this example, the cable 1320 is extended outward to form a larger diameter loop(s) to account for positional or orientation mismatch.

Figure 15C:
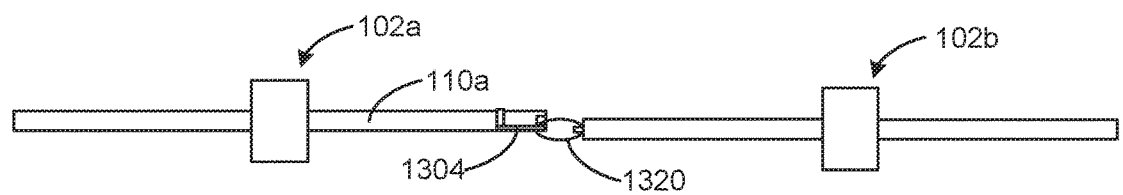

Turning to FIG. 15C, the hook 1304 is then rotated towards and into its respective wing 110*a*, thereby drawing both of the aircraft 102*a*, 102*b* closer to one another. According to the illustrated example, rotating the hook 1304 causes the cable 1320 to be restrained from coming out of engagement with the hook 1304.

Figure 15D:
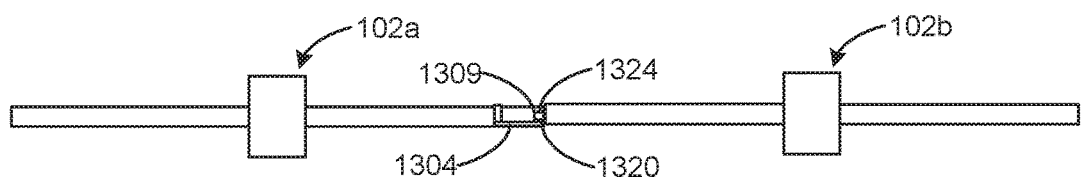

According to the illustrated example of FIG. 15D, rotation or movement of the reel 1322 winds the cable 1320 onto the reel 1322, thereby shortening the loop(s) of the cable 1320. Accordingly, this shortening of the loop(s) causes the alignment pin 1324 to be inserted into the opening 1309, thereby securing both of the aircraft 102*a*, 102*b* together. In some examples, the cable 1320 is wound onto the reel 1322 simultaneously while the hook 1304 is being rotated (as shown in FIG. 15C). Alternatively, the tension adjustment device 1326 applies tension to the cable 1320 to secure the wings 102*a*, 102*b* together.

Figure 16:
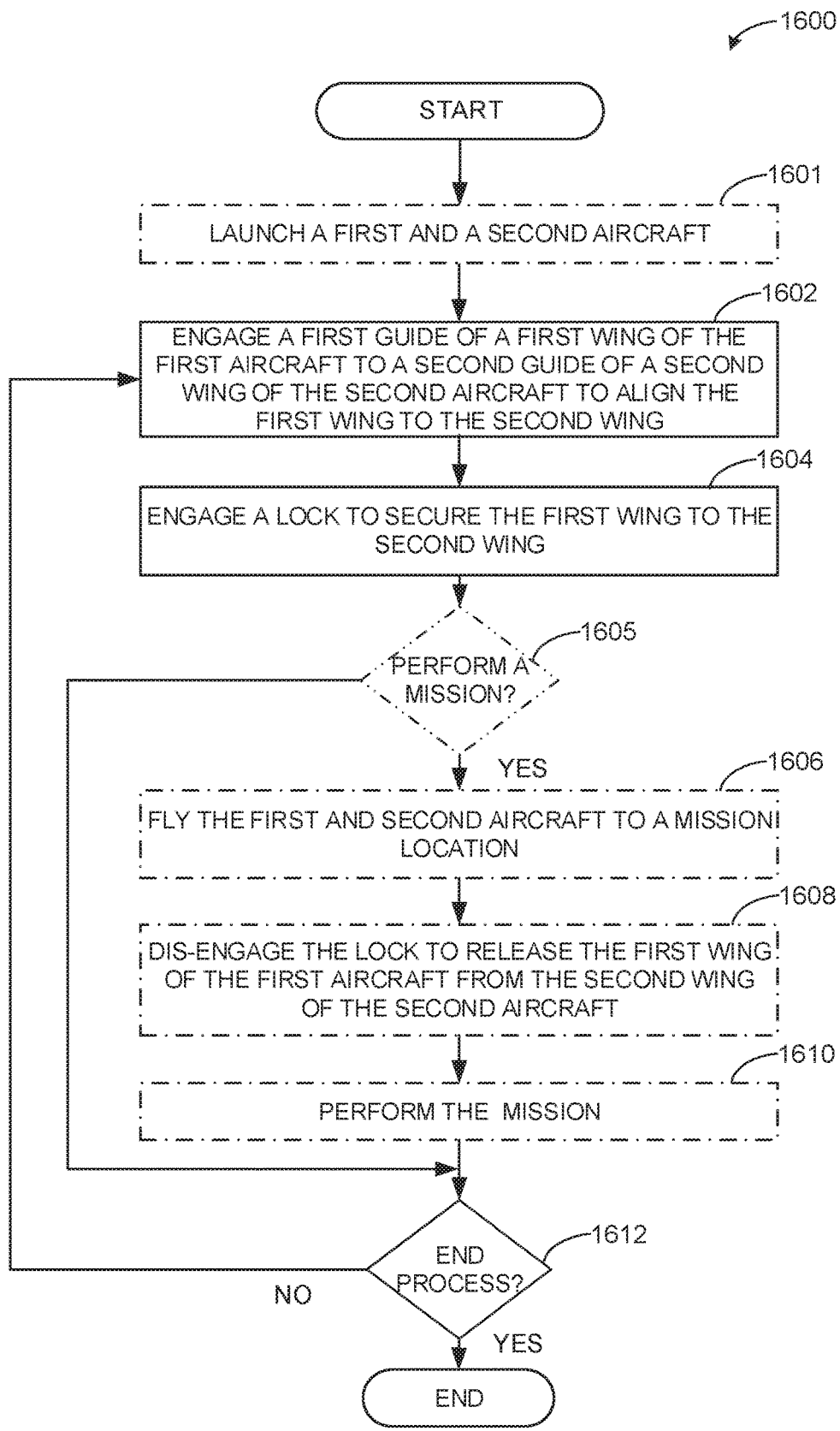
FIG. 16 is a flowchart representative of an example method for securing the aircraft of FIG. 1 using the aircraft coupling apparatus of FIGS. 1-15D.

FIG. 16 is a flowchart representative of an example method 1600 for securing the aircraft 102 of FIG. 1 using the aircraft coupling apparatus 200, 600, 800, 1300 shown in FIGS. 1-15D. Initially, a first and second aircraft (e.g., two of the aircraft 102*a*, 102*b*) take off individually. Each aircraft 102*a*, 102*b* could either take off at the same location or at different locations. The example method 1600 begins as the first and second aircraft 102*a*, 102*b* are launched (block 1601). In particular, the first and second aircraft 102*a*, 102*b* are launched separately.

According to the illustrated example, a first guide (e.g., the guide 202, the keyed rod 602, the paddle 802, the hook 1304) of a first wing 110*a* is engaged and/or contacted to a second guide (e.g., the guide 202, the keyed socket 702, the cavity 814, the cable 1320) of a second wing 110*b* to align the first wing 110*a* to the second wing 110*b* (block 1602). In particular, the first and second aircraft 102*a*, 102*b* are brought in close proximity to one another so that engagement between the first and second guides causes movement of the first and second wings 110*a*, 110*b* towards one another. Accordingly, the first and second wings 110*a*, 110*b* are aligned with each other in order to be secured together.

Next, the restraint mechanism 214 (e.g., the lock) is engaged to secure the first wing 110*a* to the second wing 110*b* (block 1604). As a result, the first and second aircraft 102*a*, 102*b* are secured together while flying or hovering at their respective wings (e.g., the wings 110*a*, 110*b*).

In some examples, it is determined whether a mission is to be performed (block 1605). If the mission is to be performed (block 1605), control of the process proceeds to block 1606. Otherwise, the process proceeds to block 1612.

In some examples, the first and second aircraft 102*a*, 102*b* are secured together to fly together to a mission location in which the first and second aircraft 102*a*, 102*b* are to be later separated to perform respective tasks (block 1606). Having the first and second aircraft 102*a*, 102*b* secured together in this example increases aerodynamic efficiency by increasing an overall aspect ratio of the wings 110.

In some examples, the restraint mechanism 214 (e.g., the lock) is dis-engaged to release the first wing 110*a* from the second wing 110*b* (block 1608). For example, the first aircraft 102*a* and the second aircraft 102*b* can be separated during flight by varying the relative speed(s) of the first and second aircraft 102*a*, 102*b*. In other words, the first and second aircraft 102*a*, 102*b* are released from each other to enable the first and second aircraft 102*a*, 102*b* to perform their respective tasks, which may be in different locations. In some examples, the first and second aircraft 102*a*, 102*b* are caused to have different velocities to facilitate the separation of the first and second aircraft 102*a*, 102*b*.

In this example, the first and second aircraft 102*a*, 102*b* perform their tasks (e.g., their respective mission(s)) while being separated from one another (block 1610). In particular, the first and second aircraft 102*a*, 120*b* can perform different functions and/or perform operation(s) in different sub-locations (e.g., within the mission location).

In some examples, it is then determined whether to end the process (block 1612). For example, this determination may be based on whether the first and second aircraft 102*a*, 102*b* have finished their respective operation(s) in corresponding locations and, thus, should be aligned and secured together again (blocks 1602, 1604), thereby improving overall aerodynamic efficiencies of the first and second aircraft 102, 102*b* on a return flight. Otherwise, the process ends.

FIG. 17 is a flowchart representative of an example method 1700 for making the aircraft 102 of FIG. 1 and/or associated components of the aircraft 102 having the coupling apparatus 200, 600, 800, 1300 described in connection with FIGS. 1-15D. The example method 1700 of the illustrated example begins as a wing 110 or other outboard structure of an aircraft 102 is provided with components and/or features that enable the aircraft 102 to be secured to other aircraft 102 while the aircraft 102 is hovering and/or is cruising in flight.

According to the illustrated example, the guide 202 (e.g., the winglets 204) is defined on the wing (block 1702). The guide is either assembled to and/or defined within components of the wing. In particular, the guide 202 may be added as a component to the wing 110 or the wing 110 may be modified to include at least one feature associated with the guide 202 via a manufacturing process (e.g., a sheet metal operation, a bending operation, a cutting operation, etc.).

Next, the restraint mechanism 214 (e.g., the lock) is defined on the wing 102 (block 1704). In this example, the restraint mechanism 214, which may include an associated actuator (e.g., the actuator 616, the actuator, the actuator 712, the actuator 803 or the actuator 1312), is placed within an internal volume of the wing 102. According to the illustrate example, the restraint mechanism 214 is coupled and/or assembled to the wing 102. In other examples, the restraint mechanism 214 is integral with the wing 102.

In some examples in which the lock and/or the guide also function as a landing support, a landing support component(s) is coupled to the lock and/or the guide (block 1706) and the process ends. For example, components that facilitate landing or supporting the weight of an associated aircraft are provided to the lock that is used as a landing support. For example, the lock can be provided with a wheel and/or a shock dampener to facilitate landing. In other examples, the guide and/or the lock do not require additional features or components to function as landing supports.

From the foregoing, it will be appreciated that example methods, apparatus and articles of manufacture have been disclosed that enable cost-effective and accurate alignment to secure multiple aircraft together such that wings of these aircraft are in direct contact. In particular, the examples disclosed herein allow a relatively large continuous aerodynamic surface to be defined for increased aerodynamic efficiency. The examples disclosed herein also enable relatively quick alignment of aircraft during flight. The examples disclosed herein facilitate alignment even with an initial mismatch. Some of the examples disclosed herein also can enable little or no drag penalty based on the geometry of their respective alignment devices and/or restraint mechanisms. Some of the examples disclosed herein enable both alignment and securing of wings with a single actuator. The examples disclosed herein can enable relatively strong structural connections that may be defined during flight or hovering. Some of the examples disclosed herein also enable integrated landing capabilities onto the alignment devices or the restraint mechanisms.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to aircraft, the examples disclosed herein may be applied to any appropriate securing or attachment application. Further, the examples disclosed herein may also be applied to other vehicles, such as vertical take-off and landing (VTOL) aircraft, short take-off and landing (STOL) aircraft, water-based vehicles and/or submersibles, etc.

What is claimed is:

1. An apparatus for securing a first aircraft to a second aircraft, the apparatus comprising:
    a guide configured to direct movement of a first wing of the first aircraft relative to a second wing of the second aircraft, the guide including a first winglet to align the first wing with a second winglet of the second wing, the first winglet including a first shape with a first distal shallow angle portion and a first steep angle portion extending from the first shallow angle portion to a distal end of the first wing, the second winglet including a second shape with a second distal shallow angle portion and a second steep angle portion extending from the second shallow angle portion to a distal end of the second wing, wherein engagement of the first shape to the second shape is configured to cause alignment of the first wing to the second wing; and
    a lock configured to secure the first wing to the second wing after the guide aligns the first wing to the second wing via the engagement of the first shape to the second shape.

2. The apparatus as defined in claim 1, wherein each of the first and second winglets includes an angled winglet.

3. The apparatus as defined in claim 1, wherein the lock includes a pin configured to be inserted into a socket of the second wing.

4. The apparatus as defined in claim 1, wherein the first and second winglets are opposedly faced to one another when the first and second wings are aligned via the engagement.

5. The apparatus as defined in claim 1, wherein the first steep angle portion is is angled from an external surface of the first wing at a range from 15 to 45 degrees.

6. The apparatus as defined in claim 1, wherein the first shallow angle portion is angled from an external surface of the first wing at a range from 0 degrees to 15 degrees.

7. The apparatus as defined in claim 1, further including at least one actuator to rotate at least one of the first or second winglets.

8. The apparatus as defined in claim 1, further including a proximity sensor to detect a presence of at least one of the first or second winglets.

9. An aircraft comprising:
    a first wing having a first guide;
    a second wing having a second guide, the first and second guides configured to guide the aircraft to be aligned with a second and a third aircraft during flight or hovering of the aircraft, the first guide including a first winglet configured to be aligned with a second winglet of a third wing of the second aircraft, the first winglet including a first shape with a first distal shallow angle portion and a first steep angle portion extending from the first shallow angle portion to a distal end of the first wing, the second winglet including a second shape with a second distal shallow angle portion and a second steep angle portion extending from the second shallow angle portion to a distal end of the third wing, wherein engagement of the first shape to the second shape is configured to cause alignment of the first wing to the third wing;
    a first lock coupled to the first wing, the first lock configured to secure the first wing to the third wing of the second aircraft; and
    a second lock coupled to the second wing, the second lock configured to secure the second wing to a fourth wing of the third aircraft.

10. The aircraft as defined in claim 9, wherein the first and second locks are asymmetrically arranged relative to a longitudinal axis of a fuselage of the aircraft.

11. The aircraft as defined in claim 9, wherein each of the first and second winglets includes an angled winglet.

12. The aircraft as defined in claim 9, wherein the first lock includes a first pin and the second lock includes a socket to receive a second pin of the second or third aircraft.

13. A method for securing a first aircraft to a second aircraft, the method comprising:
    contacting a first guide of a first wing of the first aircraft to a second guide of a second wing of the second aircraft, wherein engagement of the first guide to the second guide aligns a first winglet of the first wing with a second winglet of the second wing, the first winglet including a first shape with a first distal shallow angle portion and a first steep angle portion extending from the first shallow angle portion to the distal end of the first wing, the second winglet including a second shape with a second distal shallow angle portion and a second steep angle portion extending from the second shallow angle portion to the distal end of the second wing, wherein engagement of the first shape to the second shape is to cause alignment of the first wing to the second wing; and
    securing, via a lock, the first wing to the second wing after the engagement of the first and second guides aligns the first wing to the second wing.

14. The method as defined in claim 13, wherein securing the first wing to the second wing includes extending a pin into a socket.

15. The method as defined in claim 13, wherein contacting the first guide to the second guide includes engaging a first curved winglet of the first wing to a second curved winglet of the second wing.

16. The method as defined in claim 15, wherein securing the first wing to the second wing includes inserting a rod into a socket.

17. The method as defined in claim 13, further including rotating, via at least one actuator, at least one of the first or second winglets.

18. The method as defined in claim 13, further including detecting, via a proximity sensor, a presence of at least one of the first or second winglets.

19. An apparatus for securing a first aircraft to a second aircraft, the apparatus comprising:
- means for aligning a first wing of the first aircraft to a second wing of the second aircraft, the means for aligning including a first winglet of the first wing and a second winglet of the wing, the first winglet including a first shape with a first distal shallow angle portion and a first steep angle portion extending from the first shallow angle portion to a distal end of the first wing, the second winglet including a second shape with a second distal shallow angle portion and a second steep angle portion extending from the second shallow angle portion to a distal end of the second wing, wherein engagement of the first shape to the second shape is configured to cause alignment of the first wing to the second wing; and
- means for securing the first wing to the second wing after the means for aligning aligns the first wing to the second wing.

20. A method for producing an aircraft, the method comprising:
- defining a guide on a first wing, wherein the guide is to guide movement of a first winglet of the first wing towards a second winglet of a second wing, the first winglet including a first shape with a first distal shallow angle portion and a first steep angle portion extending from the first shallow angle portion to a distal end of the first wing, the second winglet including a second shape with a second distal shallow angle portion and a second steep angle portion extending from the second shallow angle portion to a distal end of the second wing, wherein engagement of the first shape to the second shape is configured to cause alignment of the first wing to the second wing; and
- defining a lock on the first wing to secure the first wing to the second wing when the first and second wings are aligned by the guide.

* * * * *